(12) United States Patent
Wofford

(10) Patent No.: US 6,500,477 B2
(45) Date of Patent: *Dec. 31, 2002

(54) STABILIZER FOR PREPARED FOODSTUFF

(76) Inventor: Miles D. Wofford, 1205 Moore St., El Paso, TX (US) 79902-2142

( * ) Notice: Subject to any disclaimer, the term of this patent is extended or adjusted under 35 U.S.C. 154(b) by 0 days.

This patent is subject to a terminal disclaimer.

(21) Appl. No.: 10/023,687

(22) Filed: Dec. 18, 2001

(65) Prior Publication Data

US 2002/0076474 A1 Jun. 20, 2002

Related U.S. Application Data

(63) Continuation-in-part of application No. 09/989,868, filed on Nov. 19, 2001, which is a continuation-in-part of application No. 09/734,779, filed on Dec. 12, 2000, now Pat. No. 6,319,536, which is a continuation-in-part of application No. 08/811,641, filed on Mar. 5, 1997, now Pat. No. 6,162,482, which is a continuation of application No. 08/483,542, filed on Jun. 7, 1995, now abandoned, which is a continuation-in-part of application No. 08/218,626, filed on Mar. 28, 1994, now abandoned, which is a continuation-in-part of application No. 07/891,295, filed on May 29, 1992, now abandoned.

(51) Int. Cl.⁷ .................................................. A23L 1/05
(52) U.S. Cl. ...................... 426/576; 426/131; 426/397; 426/574; 426/654; 426/657
(58) Field of Search ................................ 426/106, 131, 426/321, 397, 399, 512, 513, 573, 574, 576, 654, 657, 810

(56) References Cited

U.S. PATENT DOCUMENTS

| | | | | |
|---|---|---|---|---|
| 2,163,164 A | * | 6/1939 | Wickenden et al. | |
| 2,206,483 A | * | 7/1940 | Meaker | |
| 2,558,065 A | * | 6/1951 | Tice | |
| 3,264,121 A | * | 8/1966 | Tuomy et al. | |
| 3,578,497 A | * | 5/1971 | Hjermstad | |
| 3,763,138 A | * | 10/1973 | Rakoczy | |
| 3,889,002 A | * | 6/1975 | Clausi et al. | |
| 3,904,771 A | * | 9/1975 | Donnelly et al. | |
| 4,148,929 A | * | 4/1979 | Gorflen et al. | |
| 4,341,810 A | * | 7/1982 | Shank | |
| 4,554,169 A | * | 11/1985 | Anderson et al. | |
| 4,588,603 A | * | 5/1986 | Wofford | |
| 6,162,482 A | * | 12/2000 | Wofford | 426/576 |
| 6,319,536 B1 | * | 11/2001 | Wofford | 426/576 |

FOREIGN PATENT DOCUMENTS

| | | | |
|---|---|---|---|
| FR | 2012559 | * | 3/1970 |
| GB | 2058105 | * | 12/2000 |

OTHER PUBLICATIONS

Neville, A Study of Some Properties of Gelatin, Industrial and Engineering Chemistry, vol. 22, p. 57, Jan. 1930.*
Atlantic Bulletin, excerpts pp. 1, 4–8, 10, 11, and 13, 1962.*
Bitting, A.W., Appertizing, 1937, pp. 762–768, The Trade Press Room, San Francisco, CA.*
Marriott, N., Tips for Incorporating Poultry into Sausage, Meat & Poultry, p. 41, Mar. 1997.*

* cited by examiner

*Primary Examiner*—Leslie Wong
(74) *Attorney, Agent, or Firm*—Bierman, Muserlian and Lucas

(57) ABSTRACT

The stabilizer is able to stabilize both fat/oil and water and to improve the texture of mechanically separated meats. The stabilizer is a composite of gelatin, an acid, a sugar component and/or a starch component. The gelatin component is made by treating the gelatin in an aqueous slurry with an acid such that a pH of 1.0 to 4.5 is maintained throughout the treatment process. The stabilizer is especially suited for use in cased meats such as sausage, frankfurters, and bologna.

6 Claims, No Drawings

STABILIZER FOR PREPARED FOODSTUFF

CROSS REFERENCE TO RELATED APPLICATIONS

This is a continuation-in-part of U.S. patent application Ser. No. 09/989,868 filed Nov. 19, 2001 which in turn is a continuation-in-part of U.S. patent application Ser. No. 09/734,779 filed Dec. 12, 2000, now U.S. Pat. No. 6,319,536 issued Nov. 20, 2001 which was a continuation-in-part of U.S. patent application Ser. No. 08/811,641 filed Mar. 5, 1997, now U.S. Pat. No. 6,162,482, which was a continuation of U.S. patent application Ser. No. 08/483,542 filed Jun. 7, 1995, now abandoned, which was a continuation-in-part of U.S. patent application Ser. No. 08/218,626 filed Mar. 28, 1994, now abandoned, which was a continuation-in-part of U.S. patent application Ser. No. 07/891,295 filed May 29, 1992, now abandoned.

BACKGROUND OF THE INVENTION

1. Field of Invention

This invention relates to food and, more particularly, to a water and fat or oil stabilizer and a texture improver for use in food which is able to function through a broad temperature range. The stabilizer of the present invention is especially suited for frozen foods and foods made with mechanically separated meats.

2. Prior Art to Invention

Water and fat/oil are present in virtually all foodstuffs and especially all prepared foodstuffs. Typically, prepared foodstuffs go through a broad range of temperatures, freezing (−25° C.) to canning or retorting (120° C.) to baking (250° C.), as well as prolonged storage, oftentimes in either a chilled or frozen state prior to consumption. The broad temperature ranges and extended storage have a deleterious effect on the stability of the water and fat/oil in the foodstuff. Both water and fat/oil tend to migrate out of the foodstuff during prolonged storage and when the foodstuff is heated. This deleterious effect manifests itself in a number of ways, for example the foodstuff becomes dry or soggy, greasy, tough, chewy or brittle. These problems are due not only to simple movement of the fat/oil and water in the foodstuff but also to the breakdown of the foodstuff, such as the breakdown of the oil emulsion. The problem of stabilizing water and fat/oil in a foodstuff is especially a problem in the food industry where the foodstuff is subjected to a myriad of stresses due to the equipment used to mass produce the foodstuff.

To date, no one stabilizer has been found that is able to function in such a broad range of temperatures and to withstand extended frozen storage. There is a need in the food industry for a stabilizer that can withstand commercial processing, prolonged storage and operate in a broad temperature range, −25° C. to 250° C., without breaking down.

Broad temperature ranges and prolonged storage at cold temperatures can also have a deleterious effect on the texture and mouth feel of a foodstuff. There is a need for a stabilizer which maintains or improves the texture and mouth feel of foodstuffs.

Texture and mouth feel is especially important with mechanically separated meats. Mechanically separated meats, sometimes referred to as fine ground meats or mechanically deboned meats, are a species of ground meat. Mechanically separated meat is meat that is separated from the bone and, in the case of poultry, from the skin, by machine. Because of the reduced cost for mechanical deboning of meat, there has been a recent increase in the use of mechanically separated meats. This is especially true for poultry, such as turkey and chicken.

The texture of mechanically separated meat is mush or a fine ground product, hence the texture of foodstuffs made with mechanically separated meat has been a problem. For example, mechanical deboned poultry is used in sausage products, i.e. meat stuffed in a casing, and especially hot dogs or frankfurters. The amount of mechanically deboned poultry added to a sausage product must be controlled because too much impairs the texture of the product and makes it too mushy. Generally, the amount of mechanically deboned poultry used for sausage products is no greater than 20%.

There is a need for a texture improver which has a positive effect on the texture of mechanically separated meats and which allows for an increase in the amount of mechanically separated meats in sausage.

SUMMARY OF THE INVENTION

It has now been discovered that the stabilizer of the present invention improves the texture of mechanically separated meat and broadens their use in foodstuffs.

Furthermore, the stabilizer of the present invention works to stabilize fat or oil and water in food and operates in a broad temperature range, over prolonged storage periods, and under commercial processing conditions. By preventing the loss of water from a foodstuff, microbial growth or spoilage of the foodstuff is also delayed and/or prevented. Also, by stabilizing fat/oil and water, emulsions of fat/oil in water which are present in a number of foodstuffs such as salad dressing are also stabilized.

The stabilizer of the present invention works not only to prevent moisture loss of a stored, frozen or chilled food but also to prevent moisture loss after heating and prior to consumption of that frozen or chilled food. The stabilizer of the present invention also prevents moisture loss from fresh breads and the like which are prepared from either fresh dough or frozen dough, thereby extending the shelf life of the farinaceous product. It has also been found that the stabilizer of the present invention also increases the shelf life of meat products such as summer sausage which does not require refrigeration, as well as improve the texture of foodstuffs made with mechanically separated meats.

In other words, the stabilizer of the present invention works in a broad temperature range and in a variety of foods and does not break down even after being subjected to prolonged periods in the freezer and the stress of cooking in a wide variety of foodstuffs. The stabilizer of the present invention has also been found to withstand repeated freeze-thaw cycles. Furthermore, novel canned meats can be formulated using the process of the present invention from mechanically separated meats.

Foodstuffs which can be stabilized and/or have their texture improved include eggs, ground meats, mechanically separated meats, dough, sauces, gravies, and farinaceous products.

Broadly, the process for stabilizing water and/or improving texture of food such as mechanically separated meats in accordance with the present invention comprises the steps of:

(a) forming a slurry of gelatin, acid and water, at a temperature of about 0° C. to about 100° C., for a period of time of at least about 10 minutes, to fully hydrate said gelatin, said acid being present in an amount to cause said slurry to have a pH of about 1.0 to about 4.5;

(b) maintaining the pH of said slurry at about 1.0 to about 4.5;

(c) recovering a gelatin component having a pH of about 1.0 to about 4.5 from said slurry; and (d) adding said gelatin component to a foodstuff and/or said mechanical separated meat having water in an amount sufficient to stabilize said water and/or improve the texture of said foodstuff or meat.

Optionally, the recovered gelatin component is first dried and then added to a foodstuff in a particulate form. In either case, the stabilizer improves the texture of the foodstuff prepared with mechanically separated meat. Also, during the hydration of the gelatin, steps (a) and (b) above, it is best to agitate the slurry to provide a uniform slurry. Alternatively, some of the water is removed and the fully hydrated gelatin in slurry form is employed.

In order to stabilize both water and a fat/oil in foodstuffs as well as improve the texture of mechanically separated meat, it is preferred to incorporate a starch component and/or a sugar component into the foodstuff along with the gelatin component. The starch component and/or sugar component is suitably employed in the present invention either:

(1) by being added to the acid-gelatin slurry during hydration;

(2) by being dried with the gelatin and acid;

(3) by being mixed with the dried particulate gelatin; or (4) being added to the foodstuff along with the gelatin component.

Suitable starch components include flour, starch granules, pregelatinized starch, chemically modified starch, and derivatives of starch such as dextrins, maltodextrins, and corn syrups. Suitable sugar components include monosaccharides such as glucose, fructose, ribose, arabinose, mannose, xylose or galactose; disaccharides such as sucrose, maltose, cellobiose, lactose, or trehalose; and trisaccharides such as maltotriose, raffinose, cellotriose or manninotriose.

It has been found that the amount of acid can be reduced in the slurry if a sugar component selected from the group consisting of monosaccharides and disaccharides is present. Where the stabilizer of the present invention is used in a farinaceous product, it is preferred that a portion of the acid be reduced in the slurry and a sugar component selected from the group consisting of monosaccharides and disaccharides be substituted for a portion of the acid. Good results have been obtained with sucrose, glucose and fructose.

The amount of gelatin in the slurry is suitably about 0.5% to about 30% by weight and preferably about 1% to about 10% by weight. The amount of gelatin component added to the foodstuff is suitably about 0.1% to about 15% by weight foodstuff and, more preferably, about 0.1% to about 5% by weight foodstuff. It has been found that the higher the Bloom of the gelatin, the lesser the amount of gelatin added to the foodstuff to get the same effect. In other words, a 100 Bloom gelatin needs three times as much gelatin as a 300 Bloom gelatin to accomplish the same effect in accordance with the present invention.

The amount of starch component used in the slurry, step (a), is suitably about 0.5% to about 20% by weight and, more preferably, about 1% to about 10% by weight slurry. The amount of starch component added to the foodstuff, step (c), is about 0.05% to about 10% and, more preferably, about 0.25% to about 5.0% by weight based on the weight of foodstuff. If flour is used as the starch component, more flour is necessary than granular starch or other forms of starch. The amount of sugar component added to the slurry in step (a) is suitably about 2% to about 3%.

In U.S. Pat. No. 4,588,603 issued May 13, 1986, a process for preparing a stabilized food is disclosed wherein the stabilizer is an aqueous solution of fully hydrated, fully-swollen gelatin and an acid. The stabilizer of the '603 patent requires the use of non-halogenated water. Applicant has found that by using enough acid to lower the pH to about 1.0 to about 4.5 and maintaining the pH to about 1.0 to about 4.5 to recover a gelatin component at a pH of about 1.0 to about 4.5, that tap water can be used in preparing a food stabilizer.

The stabilizer of the present invention stabilizes both water and fat/oil in a variety of food systems to include eggs, dough, sauces and gravies, mechanically separated meats and ground meats. For instance, in a frozen burrito, the stabilizer of the present invention is used both in the filling of the burrito as well as the flour tortilla. In a frozen pancake, the stabilizer of the present invention is used in both the pancake itself as well as the maple syrup which is used on top of the pancake, both of which were frozen and pre-wrapped for sale to the consumer. In yet another example, the stabilizer of the present invention is used not only in the filling of a chicken pot pie but also the crust. Alternatively, the stabilizer is used only in the crust of the pie and not in the filling to stabilize the crust only.

It has been found that the stabilizer of the present invention not only stabilizes the water and fat/oil in the food but also prevents the food containing the stabilizer of the present invention from absorbing water and fats/oils. Such is beneficial in crusts, coatings, breadings, batters, and dough since it means that where the farinaceous product contains the stabilizer of the present invention while a portion of the foodstuff does not, that portion of the foodstuff that does not contain the stabilizer will not effect the farinaceous portion of the food.

It has also been found that the stabilizer of the present invention will continue to operate in the foodstuff even after the foodstuff has been heated for consumption. Even though the stabilizer of the present invention does not easily break down in the food system, it is digestible by humans and classified as generally recognized as safe (GRAS) for human consumption. Furthermore, a novel canned meat can be prepared using the stabilizer of the present invention.

The gelatin component is prepared through a slow hydration process wherein acid, water and gelatin are held between about 0° C. and about 100° C. over a period of at least about 10 minutes, more preferably, about ½ hour to about 1½ hours, so as to fully swell and hydrate the gelatin. Optionally, the hydrated acidified gelatin can be heated after being hydrated. Preferably, a slow heating process is employed such that the gelatin granules are allowed to hydrate and fully expand under controlled conditions to thereby increase their water and fat/oil stabilizing capability. Such a slow heating process is conducted at temperatures of about 10° C. to about 100° C.

The water used to form the slurry can contain halogen, e.g. chlorine, bromine and fluorine; and metal ions which are found in conventional tap water; so long as the pH of the slurry is maintained throughout the process.

The amount and type of acid are essential elements in obtaining the stabilizer of the present invention. If the water is too acidic, then the gelatin is case hardened and, unable to fully swell. If the water is not acidic enough, then the gelatin does not fully swell. The pH of the water must be between about 1.0 and about 4.5 and preferably about 4 throughout the hydration phase.

Suitable acids such as glacial acetic acid, citric acid, malic acid, ascorbic acid, succinic acid, tartaric acid, hydrochloric acid, sulfuric acid, phosphoric acid, lactic acid, maleic acid and aqueous solutions thereof can be used. The preferred acids are glacial acetic, citric, hydrochloric, sulfuric, phosphoric and lactic, with phosphoric being most preferred.

The amount of acid is sufficient to adjust the pH to within the desired range of 1.0 to 4.5.

In one specific example which is especially useful for dough-type products with leavening, the gelatin is prepared by using between 6 and 60 parts of water at about 10° C. and 25° C. combined with enough phosphoric acid to adjust the pH of the water to about 2, and then adding about 1 part of gelatin to form an acidic gelatinous aqueous slurry. The slurry is then mildly agitated for a period of time sufficient to disperse uniformly the gelatinizing agent throughout the solution so as to form a gelatinous slurry. The agitation usually continues for approximately 5 minutes. Next, the slurry is maintained at a temperature of between about 10° C. and 25° C. until the gelatin granules have become partially swollen and hydrated, usually between 15 and 25 minutes. The slurry is then agitated and heated to a temperature of between about 30° C. and 50° C. until the gelatin granules become further swollen and hydrated whereby the slurry becomes smooth and non-granular to feel. The slurry is usually held at this temperature for a period of between 10 and 30 minutes. The slurry is then further heated under agitation to a temperature of between about 65° C. and 70° C. until a uniformly clear solution is obtained. The pH of the slurry is periodically monitored throughout the process and adjusted to about 4 at the end of the process before recovering the gelatin component.

Conventional equipment is used to conduct the soaking and subsequent heating of the slurry. The slurry is mildly agitated throughout the heating program to maintain a uniform dispersion of gelatin and acid in water.

In one embodiment, the slurry is dried in any conventional manner to a moisture content of about 1% to about 15% and, more preferably, about 6%. The drying is done in a conventional way using conventional equipment, e.g. spray dryer, drum dryer, tray dryer, oven dryer, and freeze dryer. Good results have been accomplished with using a spray dryer or tray dryer. For small scale operations, a convection oven has been used with good results. The drying must be gentle enough so as not to destroy the gelatin while still driving off the moisture. The swollen gelatin and acid which is dried in an oven on a tray forms continuous sheets of material. These sheets must be ground so as to make them readily able to be added to food. Depending upon the volatility of the acid used during hydration of the gelatin, some of the acid will be driven off during drying.

Gelatin is a product obtained by the partial hydrolysis of collagen derived usually from the skin, white connective tissue, and bones of animals. It is a derived protein composed of various amino acids linked by adjacent amino and carbonyl groups to provide a peptide bond. Type-B gelatin is prepared by swelling the raw materials (usually ossein or hide stock) in an alkali saturated lime solution for 3–12 weeks. On the other hand, type-A gelatin is prepared by swelling raw materials (usually pork skins) in a dilute acid solution at a pH of 1 to 2 for 10 to 30 hours. The acid solution is prepared from hydrochloric acid, sulfurous acid, phosphoric acid or sulfuric acid. In accordance with the present invention, type-A gelatin or type-B gelatin may be utilized. The gelatin is also classified by Bloom strength. Bloom strength is a conventional numerical designation which distinguishes gelatin on a gel strength basis. Preferably, the Bloom strength of the gelatin employed in the present invention is about 175 to about 300 and, more preferably, about 200. The lower the bloom strength of the gelatin, the larger the amount of gelatin needed. When the gelatin has a Bloom of 275, the preferred amount of gelatin in the foodstuff is 0.25% to 5% by weight foodstuff.

The formation of the stabilizer of the present invention is preferably accomplished by mixing a starch component in with the slurry of acid and water and gelatin in the hydration step. The starch component added during the hydration step is preferably starch granules, pregelatinized starch or lightly modified starch. Preferably, the starch component is selected from cereal grains, tubers or roots, with the cereal grains such as wheat and corn being preferred. Whichever starch component is used, it should be capable of fully gelatinizing. In the case of pregelatinized starch, the starch granule is generally completely gelatinized after the first heating step at 30° C. to 50° C. In the case of starch granules, it is generally necessary to heat the slurry in the second heating step to about 80° C. to about 95° C. and hold the slurry at that temperature for about 10 to about 20 minutes to fully gelatinize the starch granules. Naturally, the temperature and time necessary to fully gelatinize the starch granules will be dependent upon the gelatinization point of the starch.

In one specific example, when pregelatinized starch is utilized, the stabilizer is prepared by combining between about 6 and 50 parts of water and enough acid to adjust the pH of the water to about 1.0 to 4.5 and then adding about 1 part of a mixture of gelatin and starch (the gelatin to starch being in a proportion of 1:6 to 1:1) to the water at a temperature of between about 10° C. and 25° C. to form an acidic gelatinous aqueous solution. The solution is then agitated for a period of time sufficient to thoroughly mix the gelatin and starch throughout the solution so as to form a gelatinous slurry. Agitating the solution for about 5 minutes is usually sufficient for this purpose. The slurry is then maintained at a temperature of between 10° C. and 25° C. until the gelatin granules have become partially swollen and hydrated. This step is usually conducted for between 15 and 25 minutes. Next, the slurry is heated to a temperature of between about 30° C. and 50° C. and is maintained at this temperature for about 10 to 30 minutes at which time both the gelatin as well as the pregelatinized starch are fully hydrated and wherein the slurry has been transformed into a uniformly clear solution. The slurry is then raised to a temperature of about 65° C. to about 70° C., preferably 68° C., and can be dried in a conventional manner using conventional equipment as previously described.

In yet another example, the stabilizer is prepared from water, acid and a mixture of gelatin and starch. The stabilizer is formed by combining between about 6 and 50 parts of water, enough acid to adjust the pH of the water to about 1.0 to about 4.5 and then adding about 1 part of a mixture of gelatin and non-gelatinized starch (the gelatin to starch ratio being between 1:6 to 1:1) to the water at a temperature of between about 10° C. and 25° C. thereby forming an acidic gelatinous aqueous solution. Next, the solution is agitated to disperse uniformly the gelatin and starch throughout the solution thereby forming a gelatinous slurry. The agitation may be continued for about 5 minutes. The slurry is then maintained at about 10° C. to about 25° C. until the gelatin granules have become partially swollen and hydrated. This hydration step usually takes between 15 to 25 minutes. The slurry is then heated to between about 30° C. and 50° C. and maintained at this temperature for about 10 to 30 minutes under agitation. At this point, the gelatin granules have become fully hydrated. Next, the slurry is raised to a temperature of between about 80° C. and 95° C. and maintained at this temperature for between 10 to 20 minutes. The slurry is then dried as described heretofore if desired.

It has also been found that the stabilizer of the present invention can be formed in-situ where the gelatin component is first made and then the starch component and the gelatin component are added and mixed at the same time with the food ingredients.

Where the formation of the stabilizer is in-situ, the food ingredient along with the stabilizer must be heated to above about the gelatinization point of the starch component to gelatinize the starch component.

The stabilizer of the present invention is added to the prepared foodstuff during initial preparation. Broadly, the stabilizer is added to the foodstuff in an amount sufficient to stabilize both the water and/or fat/oil present in the foodstuff and/or improve the texture of the foodstuff. This amount will vary depending on, primarily, the amount of water and/or fat/oil that is present in the foodstuff and the degree of texture improvement necessary.

More specifically, the amount of stabilizer added to the foodstuff will depend on the amount of water and/or fat/oil which is liberated by the foodstuff. Water is often liberated by a foodstuff during storage in a freezer, conventionally referred to as ice crystal formation, on the food and/or packaging. Both water and fat/oil are liberated during cooking, especially in a microwave oven, prior to consumption of the food product.

Preferably, between about 0.1 to about 5.0 parts by weight of the stabilizer of the present invention where the total weight of the food system is 100 parts is used in the foodstuff. Good results have been obtained using about 0.2 to 0.5 parts by weight of the stabilizer of the present invention based on 100 parts by weight of foodstuff.

As noted above, a cased or canned meat as well as ground meat and mechanically separated meat, in general, having improved texture can be made using the stabilizer of the present invention. Broadly, in order to make a cased or canned meat in accordance with the present invention, the following steps are employed:

A) dissolving gelatin in water by first hydrating gelatin in water with a sufficient amount of acid to adjust the pH of the water to about 1 to about 4.5, and then heating the hydrate gelatin to about 140° F. (60° C.) to fully dissolve the gelatin in the water, optionally, the hydrated gelatin is added to meat and the meat is then cooked to cause the gelatin to fully dissolve;

B) hydrating starch in water, optionally in the presence of sodium tripolyphosphate;

C) combining a ground meat with a sodium salt to form a mixture;

D) mixing the hydrated or dissolved gelatin, the hydrated starch and the meat and salt mixture to form a meat formulation; and E) optionally casing or canning or further processing said meat formulation to produce a cased or canned meat or other foodstuff having mechanically separated meat with improved texture.

The acidified, hydrated gelatin can be added to the meat directly, or the acidified, hydrated and heated solution of gelatin added to the meat, or the acidified, hydrated and slow heated gelatin added to the meat. Any one of these three stabilizers can be added to the meat.

The amount of sodium tripolyphosphate used in the present invention is suitably about 0.01% to about 2% by weight foodstuff (meat) and preferably about 0.1% to about 0.50% by weight foodstuff.

Suitable ground meat includes chicken, pork, beef, turkey, horse, lamb and fish. Good results have been obtained with chicken. Such ground meat includes mechanically separated meat.

The presence of sodium in the cased or canned meat is important and it is preferred that the amount of the sodium in the formulation is about 0.25% to about 5% by weight of the formulation. Good results have been obtained when the salt content of the meat formulation is about 2% by weight of the formulation. Suitable sodium salts include sodium chloride.

The amount of stabilizer, gelatin-starch-salt, added to the mechanically separated meat to improve its texture is about 0.1% to about 50% by weight meat and, more preferably, about 1% to about 20% by weight meat. Good results have been obtained when the mechanically separated meat has about 5–10% by weight meat.

The canning process is accomplished in a conventional manner using conventional equipment. Typically, the raw ingredients are combined, placed into a container and the container sealed. The sealed container is subjected to high temperatures to commercially sterilize the contents of the container. This process is also conventionally referred to as retort food processing.

The cased meat is made in a conventional manner using conventional equipment. Suitably, after the meat is formulated, it is then stuffed into a casing. The casing is usually either the intestines of an animal such as a sheep which has been fully cleaned or a man-made synthetic casing.

The use of the stabilizer of the present invention allows for mechanically separated meat to be used alone or with conventional ground meat in the cased meat while still providing the texture and mouth feel of a conventional cased meat.

Such cased and canned meats include sausage, bologna, frankfurters, luncheon meats, SPAM®-like products, salami, ham, chicken loaf, and turkey loaf.

The preferred amount of each component in the cased or canned meat is:

| Component | Percent by Weight |
| --- | --- |
| Ground Meat | 70%–95% |
| Gelatin | 0.1%–15% |
| Starch | 0.1%–10% |
| Sodium | 0.25%–5.0% |
| Water | 5%–25% |

A more preferred formulation for the cased or canned ground meat made in accordance with the present invention is:

| Component | Percent by Weight |
| --- | --- |
| Ground Meat | 85% |
| Gelatin | 0.5% |
| Starch | 2.5% |
| Sodium | 2.0% |
| Water | 10% |

All of these percents are based on the total weight of the foodstuff (meat formulation).

These and other aspects of the present invention may be more fully understood by reference to the following examples.

EXAMPLE 1

This example illustrates making the gelatin component.

First, 8 parts of water are combined with enough acid to raise the pH of the water to 2 at 10° C. After mixing the solution, 1 part of granular gelatin is added to the solution. The solution is then agitated for 5 minutes forming a slurry, and is allowed to stand at room temperature for 20 minutes. The slurry is then heated to 70° C. and the pH of the slurry readjusted to 4, thereby producing the gelatin component. In order to dry the gelatin component, the mixture is spread on a tray and placed in a tray dryer using hot air at 35° C. and a humidity of 20% for six hours. This dries the gelatin and acid composition down to a moisture level of about 6–12%.

Since the dried composition is in sheet form, it is ground to a particulate of about 30–40 mesh in order to facilitate its use in food.

EXAMPLE 2

This example illustrates making a tuna salad with the stabilizer of the present invention.

| Formula | Percent |
| --- | --- |
| Tuna | 42.11 |
| Salad dressing | 42.11 |
| Pickle relish | 12.62 |
| Water | 2.86 |
| Stabilizer of Example 1 | 0.32 |

All components are mixed together at 30° C. and then frozen.

EXAMPLE 3

This example illustrates making pimento cheese with the stabilizer of the present invention.

| Formula | Percent |
| --- | --- |
| Grated cheese | 40.32 |
| Salad dressing | 40.32 |
| Canned pimentos, diced | 12.24 |
| Kraft cheese Tang | 4.08 |
| Water | 1.84 |
| Stabilizer of Example 1 | 0.20 |

All components are mixed together at 30° C. and then frozen.

EXAMPLE 4

This example illustrates making a fried chicken patty. First, ground chicken (mechanically separated chicken) is mixed with starch, Fridex W, and with the stabilizer of Example 1. From the mix, conventionally sized patties are formed. Then, a batter is prepared and applied to the exterior of the patties. The batter also contained the stabilizer of the present invention. The batter formulation is:

| Component | Percent by Weight |
| --- | --- |
| Water | 68.1 |
| Flour, Cold Medal ® | 29.5 |
| Stabilizer of Example 1 | 2.4 |

In order to make the batter, the stabilizer is mixed into water and heated to above 50° C. to dissolve the stabilizer. Then the flour is mixed in. After the batter is applied to the exterior of the patties, the battered patties are breaded with the following mix:

| Component | Percent by Weight |
| --- | --- |
| Flour, Gold Medal ® | 71.22 |
| Pregelatinized Starch, Fridex W | 1.78 |

Once breaded, the patties are deep fat fried in oil at 175° C. to obtain an internal temperature of 75° C.

EXAMPLE 5

This example teaches making a cholesterol free egg which is stabilized in accordance with the present invention. Eggs are made with the following formulation:

| Formula | Percent by Weight |
| --- | --- |
| Egg whites | 62.18 |
| Water | 20.98 |
| Vegetable oil | 10.18 |
| Starch, Purity CSC ® | 4.66 |
| Stabilizer of Example 1 | 0.78 |
| Salt | 0.39 |
| Food coloring, Yellow | 0.85 |

The eggs are formulated and cooked.

EXAMPLE 6

This example illustrates making the stabilizer of the present invention with pregelatinized starch. In one illustration all components are combined in a slurry and heated together. In another illustration the stabilizer of Example 1 is used.

In the first illustration, acid, gelatin and water at 10° C. are mixed and soaked for 20 minutes. Then the slurry is heated to 45° C. and held at that temperature for 10 to 20 minutes under agitation. Next, pregelatinized starch is mixed into the slurry and the slurry heated to 60° C. and held there until smooth. The resulting slurry is then dried to form the stabilizer.

In a second illustration, water and pregelatinized starch are mixed at a temperature above 35° C. and then the dried stabilizer of Example 1 is added to the slurry. After the slurry has been agitated and obtained a smooth consistency, the slurry is dried to form the stabilizer of the present invention.

EXAMPLE 7

This example illustrates stabilizing a brown gravy using a stabilizer made in accordance with Example 6, first illustration, where the stabilizer is dried before heating to 80° C. The gravy had the following formulation:

| Formula | Percent |
| --- | --- |
| Distilled water | 9.85 |
| Beef stock | 0.065 |

-continued

| Formula | Percent |
|---|---|
| Caramel color | 10 drops |
| Burgundy wine | 0.05 |
| Stabilizer | 0.66 |

To make the stabilized gravy, all ingredients are mixed at ambient temperature and then heated to 80° C. and cooled.

EXAMPLE 8

This example illustrates stabilizing eggs using a stabilizer made in accordance with Example 6, first illustration, where the stabilizer is dried before heating to 80° C. The following formulation was used:

| Formula | Percent |
|---|---|
| Eggs, whole | 61.98 |
| Distilled water | 30.72 |
| Vegetable oil | 2.13 |
| Stabilizer | 2.82 |
| Salt | 0.35 |

All ingredients are combined and brought to 62° C. The liquid egg mix is then fried at 80° C. to cook the eggs.

The stabilizer only hydrates and does not increase viscosity or pull moisture away from the egg, causing a texture problem. Then, when the egg is cooked, the stabilizer thickens as the egg coagulates, giving correct texture, stability, freeze-thaw, and microwavability.

EXAMPLE 9

This example illustrates stabilizing a sausage patty made from mechanically separated pork in accordance with the present invention using the stabilizer of Example 6, first illustration. The following sausage formulation was used:

| Formula | Amount (Percent) |
|---|---|
| Sausage | 98.20 |
| Modified Waxy Maize Starch[1] | 1.00 |
| Stabilizer | 0.80 |

[1]Fridex W from National Starch and Chemical Co.

The modified waxy starch is first heated in water to 60° C. and then dried.

All the materials are mixed together, allowed to stand at ambient temperature for 10 minutes and then pan fried.

EXAMPLE 10

This example illustrates stabilizing a farinaceous product, namely a tortilla shell.

First, a dough stabilizer in accordance with the present invention was formed:

| Formula | Parts by Weight |
|---|---|
| Water | 8 |
| Gelatin | 1 |
| Acid | ¼ |

This stabilizer is made following the procedure in Example 1 above.

Next, the dried stabilizer is incorporated in a dough for a tortilla to stabilize the tortilla. The formula for the tortilla is as follows:

| Formula | Percent by Weight |
|---|---|
| Flour | 57.46 |
| Water | 24.99 |
| Lard | 11.10 |
| Modified waxy maize[1] | 2.89 |
| Baking powder | 2.22 |
| Salt | 1.02 |
| Stabilizer | 0.32 |

[1]Frigex W from National Starch and Chemical Co.

The ingredients except water and stabilizer are mixed together until all lumps are gone. Then the water with stabilizer therein are mixed in.

EXAMPLE 11

This example illustrates using the dough stabilizer of Example 10 above to stabilize a pancake mix. Pancakes were formulated as follows:

| Formula | Percent |
|---|---|
| Commercial mix | 48.206 |
| Modified waxy maize[1] | 1.339 |
| Water | 49.761 |
| Dough Stabilizer | 0.694 |

[1]Frigex W from National Starch and Chemical Co.

First, the dough stabilizer is added to 20% of the water and heated to 45° C. and held there for 10 minutes. Next, the remaining water is added to the warm water and the stabilizer and water is added to the dry ingredients.

EXAMPLE 12

This example illustrates stabilizing a meat and bean burrito filling and then using that filling in conjunction with the tortilla shell of Example 10 to make a frozen burrito. The burrito filling is as follows:

| Formula | Percent |
|---|---|
| Water | 27.98 |
| Drained pinto beans | 9.57 |
| Meat | 8.9 |
| Tomato paste | 1.18 |
| Burrito seasoning | 1.66 |
| Starch[1] | 2.75 |
| Stabilizer of Example 1 | 0.41 |

[1]Purity W from National Starch and Chemical Co.

All ingredients except seasoning, meat and stabilizer are mixed and heated to 85° C. Then the meat and stabilizer are added, the ingredients are continued to be mixed, and then the seasoning is added in. The seasoning, if it contains salt, should be added at the end. If it contains no salt, then the seasoning is mixed in initially with the other ingredients. The meat is mechanically separated beef.

The filling is then wrapped in the tortilla and frozen.

EXAMPLE 13

This example teaches stabilizing tomato sauce in accordance with the present invention. A tomato sauce of the following formulation is prepared:

| Formula | Percent |
| --- | --- |
| Commercial tomato sauce | 14.20 |
| Pregelatinized starch[1] | 0.71 |
| Gelatin (300 Bloom) | 0.16 |

[1]Instant Pure Flo from National Starch and Chemical Co.

The sauces and gelatin are mixed at 10° C. and held for 20 minutes. Then the mix is heated to 45° C. and the starch is added. This mix is then held at 45° C. for 10 to 20 minutes and then the temperature raised to 60° C.

Most sauces have a pH within the range of 1.0 to 4.5. Good results are obtained by lowering the pH to below about 4.0 prior to adding the gelatin. Vinegar has been found to be good for adjusting the pH in tomato sauce.

It is noted that all salt additions should be done at the end of the cooking process since the ions in salt, namely sodium, tend to interfere with the acting of the gelatin in the food system.

From a manufacture of gelatin, the finished slurry before drying, has a solids content of about 30% by weight. To this slurry, the temperature is raised to about 45° C., enough acid is added to adjust the pH to about 1.0 to 4.5, and the slurry is agitated for 10 minutes. Then the slurry is dried as previously disclosed. This produces the dried gelatin component for use in stabilizing food in accordance with the present invention.

EXAMPLE 14

This example illustrates the importance of phosphoric acid compared to other acids.

Using tap water, six solutions were made using a conventional 300 Bloom gelatin. Each solution contained the same amount of tap water and gelatin. In order to prepare each solution, the pH of the tap water was adjusted to about 2 with the acid. Then the gelatin was added to the water and allowed to hydrate at room temperature for 20 minutes. Next, the solution was heated to 70° C. and the pH adjusted to about 4 with the acid again. These samples were then frozen overnight and the loss of water was measured. The results from these tests and the acids used are listed below:

| Acid | Water Loss (% by wt.) |
| --- | --- |
| Sulfuric | 6.8 |
| Hydrochloric | 4.2 |
| Glacial acetic | 3.6 |
| Citric | 4.8 |
| Lactic | 2.8 |
| Phosphoric | 2.2 |

As can be seen, phosphoric gave superior results but all the acids gave acceptable results.

EXAMPLE 15

This example illustrates making a canned meat with the stabilizer of the present invention. The meat formulation is as follows:

| Ingredient | Amount (% by wt.) |
| --- | --- |
| Fine ground meat | 85 |
| Salt | 2 |
| STP | .25 |
| Starch | 2.5 |
| Water | 10 |
| Gelatin (275 Bloom) | .25 |

In order to make the canned meat, the gelatin is added to tap water which had its pH adjusted to about 2 with phosphoric acid. The gelatin is allowed to hydrate for 20 minutes and then the sodium tripoly-phosphate (STP) is mixed into the acid-water-gelatin mixture. Then the meat, starch, salt and hydrated gelatin slurry is mixed together.

It should be noted that if the STP is left with the acid-water-gelatin mix too long without adding the other components, the STP can cause a rise in the pH and destroy the effect of the acidified gelatin. Thus, the time between addition of the STP and the other components should be short. Alternatively, the STP can be mixed with water and then the mixture added to the other components along with the acidified gelatin mix.

The fine ground meat was mechanically separated chicken.

It has been found that the canned meat has improved texture compared to conventional canned meats and is able to be fried in a pan without loosing its texture.

EXAMPLE 16

This example illustrates the use of the stabilizer to improve the texture of a cheese analogue and to reduce the amount of casein used to make the cheese analogue. The following formulation was used:

| Ingredient | Amount (% by wt.) |
| --- | --- |
| Water | 30.00 |
| Oil | 20.00 |
| Casein | 25.00 |
| Real cheese | 10.00 |
| Spices and Preservatives | 4.50 |
| Stabilizer: | |
| Starch | 0.50 |
| Dried gelatin component | 0.75 |

The water, oil, and casein are mixed and then the starch is added. The mixture is heated to 90° C. and the dried gelatin added once the starch has gelatinized. Next, the seasonings and preservatives are added along with the real cheese component (mozzarella).

This cheese has been used on pizza and it was found that the cheese retained its form and did not absorb sauces the way other conventional cheeses did.

EXAMPLE 17

This example illustrates the improved texture of real cheese using the stabilizer of the present invention. The following formulation was used:

| Ingredients | Amount (% by wt.) |
|---|---|
| Cheddar cheese | 94.50 |
| Stabilizer: | |
| Starch slurry | 5.00 |
| Gelatin component | .50 |

The cheese and stabilizer were mixed at 82° C. and the mixture formed into a block and frozen. After a week in the freezer, it was thawed and found to have excellent texture.

EXAMPLE 18

This example illustrates making a canned meat with mechanically separated meat and the stabilizer of the present invention. The meat formulation is as follows:

| Ingredient | Amount (% by wt.) |
|---|---|
| Fine ground meat (mechanically separated meat) | 85.0 |
| Salt | 2.0 |
| STP | 0.25 |
| Starch | 3.0 |
| Water | 10.0 |
| Gelatin (275 Bloom) | .25 |

In order to make the canned meat, the gelatin is added to tap water which had its pH adjusted to about 3.5 with food grade phosphoric acid. The gelatin is allowed to hydrate for 20 minutes and then the other ingredients are added and mixed together. The meat was chicken.

EXAMPLE 19

This example illustrates making a cased chicken frankfurter or bologna. The meat formulation is as follows:

| Ingredient | Amount (% by wt.) |
|---|---|
| Mechanically separated chicken | 83.581 |
| Water | 9.820 |
| Modified Food Starch | 2.999 |
| Salt | 2.046 |
| Gelatin | .750 |
| Seasoning | .420 |
| Sodium Tripolyphosphate | .250 |
| Phosphoric Acid | .075 |
| Sodium Erythorbate | .046 |
| Sodium Nitrate | .013 |
| TOTAL | 100.000% |

In order to make the frankfurter, the following process was employed. Use 46% of water with gelatin to make a slurry, adjust pH of slurry to 3.50 with food grade phosphoric acid. Use remaining water to mix starch slurry, dissolve sodium tripolyphosphate and sodium erythorbate. Add meat, curing ingredients, spices and mix. Add starch slurry and mix. Add acidified gelatin slurry and mix. Fill into casings and cook. After cooking, chill and store. It should be noted that ascorbate can be used in place of the erythorbate.

EXAMPLE 20

This example illustrates the versatility of the present invention.

The formulation of Example 19 was made and then canned, not cased. A pan friable product was produced. Thus, the canned meat formulation can be used to make a cased meat.

EXAMPLE 21

This example illustrates using a 50/50 blend of mechanically separated meat and ground meat to make a cased meat.

Using the formulation of Example 19, half of the mechanically separated chicken is replaced with ground pork. Otherwise, the same procedure is used to make and stuff the casing. A suitable frankfurter was made.

EXAMPLE 22

This example illustrates making frankfurters or bologna using a formulation similar to the one of Example 19 above using the following formulation:

| Ingredients | Amount (% by weight) |
|---|---|
| Poultry: chicken | 83.581 |
| Seasoning, salt and cure: | |
| Seasoning | .420 |
| Salt | 1.850 |
| Cure | .209 |
| Subtotal | 2.479 |
| STP/Erythorbate blend: | |
| Sodium tripolyphosphate | .250 |
| Sodium Erythorbate | .046 |
| Water | 1.000 |
| Subtotal | 1.296 |
| Starch blend: | |
| Starch | 2.999 |
| Water | 4.330 |
| Subtotal | 7.329 |
| Gelatin blend: | |
| Gelatin | .750 |
| Phosphoric acid | .075 |
| Water | 4.490 |
| Subtotal | 5.315 |
| TOTAL | 100.000 |

The following procedure was used to make the meat product.

Combine chicken, seasoning, salt, cure, erythorbate and STP blend. Mix 20 minutes. Add pre-hydrated starch blend. Mix 5 to 10 minutes or until uniformly blended.

EXAMPLE 23

Using the formulation and procedure in Example 2, ham salad, egg salad and chicken salad have been made in accordance with the present invention, except chopped ham, chopped egg and chopped chicken was used in place of the tuna.

EXAMPLE 24

This example illustrates stabilizing eggs using the stabilizer of Example 1 above. The following formulation was used:

| Formula | Percent (wt) |
| --- | --- |
| Eggs, whole | 61.98 |
| Water, distilled | 30.72 |
| Modified Food Starch (Frigex W) | 4.13 |
| Vegetable Oil | 2.13 |
| Dried Stabilizer of Example 1 | 0.69 |
| Salt | 0.35 |

Mix the stabilizer with about one-fifth of the water to hydrate for 20 minutes. Then mix all of the remaining ingredients in with the hydrated stabilizer and heat to 110° F. The eggs are now ready to be cooked.

EXAMPLE 25

This example illustrates making a pizza crust in accordance with the present invention. The dough was made with the following ingredients:

| Ingredient | Percent (wt) |
| --- | --- |
| Pizza flour | 65.70 |
| Water | 26.26 |
| Yeast | 3.78 |
| Oil | 2.66 |
| Sugar | 1.26 |
| Dried Stabilizer of Example 1 | 0.33 |

After hydrating the stabilizer in water for 20 minutes, the ingredients were all mixed using conventional equipment and procedure. The crust was then cooked.

It was found that the crust retarded ingress of water when refrigerated, frozen, and when heated, to include microwave heating.

It should be noted that when employing the stabilizer of the present invention with yeast in doughs, the pH of the gelatin should be about 4 to about 4.3.

EXAMPLE 26

This example illustrates making a pizza sauce.

Using a conventional pizza sauce, 1.3% by weight of the dry stabilizer of Example 1, after being fully hydrated, was mixed in with the other ingredients.

It was found that the sauce did not weep into the crust during refrigeration, in the freezer or during heating, to include microwave heating.

EXAMPLE 27

This example illustrates the use of the present invention in a picante sauce.

The dried stabilizer of Example 1, and modified food starch were added to a conventional picante sauce and then heated to 180° F. and finally chilled. The amount of modified food starch used was 4.5% by weight and the amount of stabilizer was about 1%. The picante sauce was stabilized during frozen storage and heating.

EXAMPLE 28

This example illustrates making a country gravy.

| Ingredients | Parts by wt. |
| --- | --- |
| Water | 16.00 |
| Country Gravy Mix | 2.75 |
| Vinegar | 0.08 |
| Dried Stabilizer of Example 1 | 0.24 |

All ingredients except stabilizer were mixed, heated to 160° F., held for 10 minutes and then heated to 190° F. Then the stabilizer was added and mixed in.

EXAMPLE 29

This example compares a meatloaf made with the stabilizer of the present invention and one without the stabilizer.

| | Parts by Weight | |
| --- | --- | --- |
| Ingredients | Present Invention | Conventional |
| Hamburger | 32 | 32 |
| Diced Onion | 1.1 | 1.1 |
| Salt | .48 | .48 |
| Pepper | .1 | .1 |
| Onion Powder | .05 | .05 |
| Modified Food Starch | .48 | .48 |
| Dried Stabilizer of Example 6 | .38 | — |

All ingredients were mixed and then cooked for one hour at 350° F. After freezing overnight and dethawing, it was found that the meatloaf made with the stabilizer of the present invention had good mouth feel while the conventional meatloaf was hard and chewy.

EXAMPLE 30

This example compares an enchilada sauce made with the stabilizer of the present invention and one without the stabilizer.

| | Parts by Weight | |
| --- | --- | --- |
| Formula | Present Invention | Conventional |
| Enchilada Sauce (Hatch Brand) | 22.75 | 22.75 |
| Vinegar | .15 | — |
| Dried Stabilizer of Example 1 | .32 | — |

Each sauce was frozen overnight and then thawed to check for bleed, water separation. The present invention enchilada sauce had 0% bleed while the conventional enchilada sauce had 20% bleed. After microwaving, the present invention enchilada sauce was smooth while the conventional one was loose and separated.

It will be understood that the claims are intended to cover all changes and modifications of the preferred embodiments of the invention herein chosen for the purpose of illustration which do not constitute a departure from the spirit and scope of the invention.

What is claimed is:

1. A process for improving the texture of a foodstuff comprising the steps of:

(a) forming a slurry of gelatin, acid and water, at a temperature of about 0° C. to about 100° C., for a period of time of at least about 10 minutes, to fully hydrate said gelatin, said gelatin being present in said slurry in an amount of about 0.5% to about 30% by weight of said slurry, said acid being present in an amount to cause said slurry to have a pH of about 1.0 to about 4.5, wherein said acid is selected from the group consisting of glacial acetic acid, citric acid, lactic acid, hydrochloric acid, sulfuric acid, phosphoric acid and aqueous solutions thereof;

(b) maintaining said slurry at a pH of about 1.0 to about 4.5;

(c) recovering a gelatin component having a pH of about 1.0 to about 4.5 from said slurry, said gelatin component comprising gelatin and said acid; and (d) adding said gelatin component to a foodstuff in an amount sufficient to stabilize water in said foodstuff.

2. The process of claim 1 wherein a starch component selected from the group consisting of flour, starch granules, pregelatinized starch, modified starch and starch derivatives, is added to said slurry and agitated in said slurry in an amount of about 0.5% to about 10% by weight slurry, and said gelatin component further comprises said starch component.

3. The process of claim 1 wherein a starch component selected from the group consisting of flour, starch granules, pregelatinized starch, modified starch and starch derivatives is added to said meat with said gelatin component in an amount of about 0.05% to about 10% by weight foodstuff.

4. The process of claim 1 wherein a sugar component selected from the group consisting of a monosaccharide, a disaccharide and a trisaccharide is added to said slurry and agitated with said slurry in an amount of about 25 to about 3% by weight slurry, and said gelatin component further comprises said sugar component.

5. The process of claim 1 wherein said acid is phosphoric acid.

6. The process of claim 1 wherein said step of recovering a gelatin component comprises the step of drying said slurry to a moisture content of about 1% to about 15% by weight to obtain a dry gelatin component, and the amount of dry gelatin component added to the foodstuff is about 0.1% to about 15% by weight based on the foodstuff.

* * * * *